United States Patent

Everett

[15] 3,686,579

[45] Aug. 22, 1972

[54] SOLID-STATE, ACOUSTIC-WAVE AMPLIFIERS

[72] Inventor: Peter G. Everett, Oak Park, Ill.

[73] Assignee: Zenith Radio Corporation, Chicago, Ill.

[22] Filed: June 21, 1971

[21] Appl. No.: 154,967

[52] U.S. Cl. ....................330/5.5, 330/35, 330/38 M
[51] Int. Cl. ....................H03f 3/04
[58] Field of Search ....................330/5.5

[56] References Cited

FOREIGN PATENTS OR APPLICATIONS 6,812,862 3/1970 Netherlands ....................330/5

*Primary Examiner*—Roy Lake
*Assistant Examiner*—Darwin R. Hostetter
*Attorney*—Francis W. Crotty

[57] ABSTRACT

In a signal amplifier, an input transducer launches acoustic surface waves at a given velocity along a predetermined path on a piezoelectric substrate. An output transducer responds to those waves for developing an output signal. A film of semi-conductive material between the input and output transducers responds to a unidirectional potential for conducting charge carriers alongside the propagation path at a velocity slightly greater than the acoustic wave velocity to achieve a amplification of the acoustic surface waves. Finally, a unidirectional field is applied transversely through the semi-conductive film to control the density of the charge carriers and the amplification.

7 Claims, 2 Drawing Figures

Figure 1:
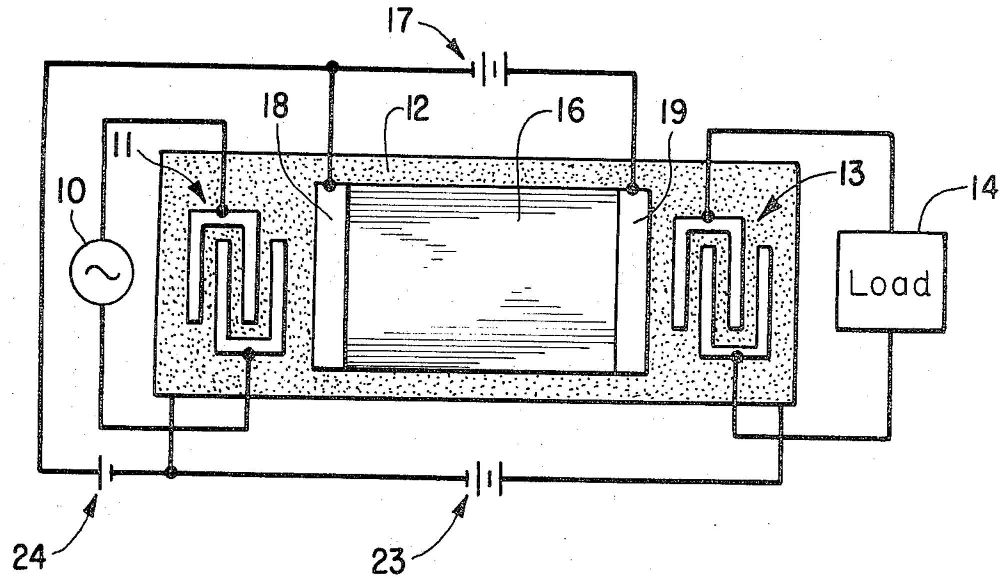

Inventor
Peter G. Everett
By Francis W. Crotty
Attorney

SOLID-STATE, ACOUSTIC-WAVE AMPLIFIERS

BACKGROUND OF THE INVENTION

The present invention pertains to solid-state, acoustic-wave amplifiers. More particularly, it relates to an acoustic-wave amplifier of the so-called sandwich type in which energy is delivered from traveling charge carriers in a semi-conductive film to acoustic surface waves in an adjoining substrate.

Much interest has recently been evidenced in acoustic surface-wave devices. Typically, an input transducer responds to electrical signals by launching the waves on the surface of a piezoelectric substrate. Spaced on that surface from the input transducer is an output transducer that, in turn, responds to the propagating waves for developing an output electrical signal. The device exhibits a bandpass frequency-selectivity characteristic that may be tailored to act as a filter when employed in a communication signal channel. It also may be used advantageously for its signal delay characteristics.

In most applications, however, surface-wave devices also cause an inherent attenuation of the signals being transmitted. This often necessitates the inclusion of an additional amplification stage in the signal channel in order to compensate such loss. In an effort to overcome that disadvantage, several approaches have been suggested for including an amplifying mechanism within the surface-wave device. Apparatus of that nature is disclosed in U.S. Pat. No. 3,388,334 issued to Robert Adler on June 11, 1968. According to that teaching, a film of semi-conductive material is disposed on the wave-propagating surface between the input and output transducers. A unidirectional bias potential is applied across the ends of the film to effect movement of charge carriers in the semi-conducting medium. When the velocity of those charge carriers is slightly greater than the velocity of propagation of the acoustic surface waves, energy is delivered from the charge carriers to the acoustic surface waves. Consequently, the latter are amplified. While this approach seems to be perfectly valid in principle, it, unfortunately, has encountered the drawback that at least reasonably available materials do not result in the achievement of a degree of interaction between the charge carriers and the surface waves enabling the attainment of an adequate level of signal amplification.

It is, accordingly, a general object of the present invention to provide a new and improved surface-wave amplifier in which an increased level of amplification is obtained.

Another object of the present invention is to provide such an amplifier in which the improvement may be achieved by the use of fabrication techniques compatible with the construction of the remainder of the device.

A signal amplifier constructed in accordance with the present invention includes a piezoelectric substrate propagative 3 of acoustic surface waves. An input transducer on the substrate responds to an input signal and launches acoustic surface waves along a predetermined path at a given velocity. Spaced on the substrate from the input transducer is an output transducer that responds to the acoustic surface waves for developing an output signal. Disposed between the input and output transducer is a layer or film of semi-conductive material which responds to an applied unidirectional potential for conducting charge carriers alongside the path of wave propagation at a velocity slightly higher than the acoustic wave velocity as a result of which energy from the charge carriers is delivered to the acoustic surface waves and amplification is obtained. Finally, the amplifier includes control means for applying a unidirectional field transversely through the semi-conductive layer and the substrate to control the density of the charge carriers in the semi-conductive material and the amplification.

Figure 2:
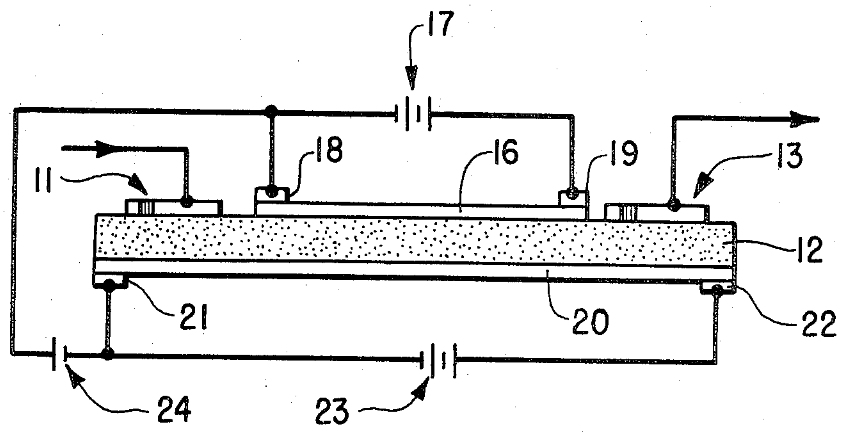

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIG. 1 is a diagrammatic plan view of an embodiment of the present invention; and FIG. 2 is a side-elevational view of the embodiment of FIG. 1, certain connecting leads and associated stages being omitted for the purpose of clarity.

In FIG. 1, a signal source 10 is connected across an input transducer 11 mechanically coupled to one major surface of a body of piezoelectric material in the form of a substrate 12. An output or second portion of the same surface of substrate 12 is, in turn, mechanically coupled to an output transducer 13 across which a load 14 is connected. Transducers 11 and 13 are each constructed as a pair of comb-type electrode arrays. The strips or conductive elements of one comb are interleaved with the strips of the other in each pair. The electrodes are of a material, such as gold or aluminum, which may be vacuum deposited on a smoothly lapped and polished planar surface of the piezoelectric body. The piezoelectric material, such as quartz, PZT or lithium niobate, is propagative of acoustic waves. The distance between the centers of two consecutive strips in each array is one-half of the acoustic wavelength of a signal for which it is desired to achieve maximum response.

Direct piezoelectric surface-wave transduction is accomplished by the spatially periodic interdigital electrodes or teeth of transducer 11. A periodic electric field is produced when a signal from source 10 is fed to the electrodes and, through piezoelectric coupling, the electric signal is transduced to a traveling acoustic surface wave on substrate 12. This occurs when the stress components produced by the electric field in the piezoelectric substrate are substantially matched to the stress components associated with the surface-wave mode. The surface waves resulting in substrate 12, in response to the energization of transducer 11, are transmitted along the substrate to output transducer 13 where they are converted to electrical output signals that are fed to load 14.

In a typical television intermediate-frequency-amplifier embodiment, utilizing PZT as the piezoelectric substrate, the strips of input transducer 11 are approximately 0.5 mil wide and are separated by about 0.5 mil for the transmission of an IF signal in a typical range of 40–46 mhz. The strips of output transducer 13 are similarly dimensioned. The spacing between input transducer 11 and output transducer 13 is on the order of 60 mils and the width of the wavefront launched by input transducer 11 is approximately 120 mils. The combination of transducer 11 and output transducer 13 together with the effect of substrate 12 can roughly be compared to a cascade of two tuned circuits with a resonant frequency of approximately 40 mhz.

The potential applied between any given pair of successive strips of electrode array 11 produces two waves traveling along the surface of substrate 12, in opposing directions perpendicular to the strips for the illustrative isotropic case of a ceramic substrate poled perpendicularly to the surface. In this case, the waves propagated to the left of transducer 11 in FIG. 1 are not utilized, and advantageously they may be dissipated in an attenuative medium placed upon the substrate or dispersed, as by serrating the left-hand end portion of the substrate, so as to avoid the reflection of those left-directive waves back through the device. For increased selectivity, that is, a narrowing of the frequency response characteristic, additional electrode strips may be added to the comb patterns of the transducers. Further modifications and adjustments are described in copending application, Ser. No. 741,038, filed Apr. 12, 1968, by Adrian DeVries and assigned to the same assignee as the present application. Such modifications may particularly be for the purpose of tailoring or shaping the response presented by the overall filter to the transmitted signal.

As thus far described, a signal transmitted through the filter of FIG. 1, suffers attenuation by reason of less than complete conversion between the electrical signals and the acoustic waves in the transducers and also because of inherent attenuation of the waves as they propagate along the surface of substrate 12. To the end of overcoming that loss, a layer or film 16 of semi-conductive material is deposited on the wave-propagating surface of substrate 12. Film 16 is disposed between input transducer 11 and output transducer 13. Further, a source 17 of unidirectional potential is connected across opposing ends of film 16 so as to produce a drift field that causes charge carriers (e.g., electrons or holes) to be conducted in film 16 alongside the wave-propagation path. For that purpose, separate electrodes 18 and 19 are affixed to the opposing ends of film 16. Utilizing an N-type semi-conductive material, the negative terminal of source 17 is connected to electrode 18 and the positive terminal is connected to electrode 19.

A typical semi-conductive material is N-type silicon or cadmium sulfide. Other suitable semi-conductors include those whose chemical formulation is of the form $Cd_xZn_yAs$ or $Cd_XPb_{(1-x)}Te$. In any event, the semi-conductor chosen must include charge carriers that are movable parallel to the propagation path of the acoustic waves under the influence of, and at velocity determined by the strength of, the unidirectional potential applied across semi-conductive film 16. The magnitude of that unidirectional potential, which determines the velocity at which the charge carriers move, is adjusted to establish a velocity slightly greater than the velocity of acoustic wave propagation. In consequence, energy is delivered from the charge carriers to the acoustic surface waves. More particularly, the acoustic surface waves propagating in piezoelectric substrate 12 induce charge bunches in film 16 that correspond to the acoustic waves on the piezoelectric material. The amplitude of the acoustic waves is modified due to the interaction of the charge bunches on semi-conductive film 16 created by the electric field effects between substrate 12 and film 16 and the electric charge carrier flow established in film 16 as a result of the unidirectional potential applied to it. As such, the amplifying mechanism is basically the same as that described in more detail in the aforementioned Adler patent. Moreover, that patent discloses various refinements which advantageously may be included in the device of the present application. For example, semi-conductive film 16 may be of intrinsic, or near-intrinsic, conductivity and may exhibit mobility of both holes and electrons. One of those types of charge carriers is utilized as described in order to obtain gain, while the other type travels in a reverse direction at a velocity which serves to cause attenuation of reflected surface wave energy propagating in such reverse direction. For present purposes, however, it is sufficient to consider only the basic amplification mechanism of traveling interaction between the charge carriers and the surface waves in a manner to obtain gain.

Within semi-conductive film 16, the free charge available per unit area for interacting movement is expressed by the quantity $nq\theta$, where $n$ is the charge carrier density, $q$ is the charge on each carrier and $\theta$ is the thickness of film 16. It can be shown that the amount of amplification obtained is inversely proportional to the square of that free charge quantity. In order to increase the level of amplification, control means are included for applying a unidirectional field transversely through film 16 and substrate 12 in the wave propagation path. The unidirectional field reduces the charge carrier density in the semi-conductive material. Consequently, increased amplification is obtained. More particularly, the control means includes a strip 20 of resistive material disposed on the opposite side of substrate 12 from film 16. Connected across opposite ends of strip 20, by means of electrodes 21 and 22, is another unidirectional potential or voltage source 23. Finally, a still additional bias source 24 of unidirectional voltage is connected between electrode 21 and electrode 18 to create the transversely directed electric field. Electrodes 18, 19, 21 and 22 may be formed by evaporating a conducting material such as aluminum upon the exposed surface of the respective previously deposited layers. Of course, the thicknesses of film 16, strip 20 and the electrodes are greatly exaggerated in the drawings for convenience of illustration.

In operation, the creation of the transverse electric field not only decreases the charge-carrier density with a resulting increase in amplification level, but the magnitude of the transverse field may be selectively controlled in order to adjust the gain of the amplifier to whatever value is desired in a particular application. Further, the level of the output signal delivered to load 14 from output transducer 13 may be sensed to develop a control signal to be utilized to vary the transverse potential and obtain automatic gain control.

The addition of the transverse field permits a reduction in charge carrier density while yet retaining high carrier mobility. This contrasts with approaches like that of the prior Adler patent wherein the large carrier density of typical materials at ambient temperature tends to counteract the advantage of choosing a semiconductor that exhibits a high carrier mobility in order to reduce the required drift field and, hence, minimize power dissipation. At the same time, the semi-conductor resistance may be sufficiently high to achieve adequate gain.

In principle, resistive strip 20 may be replaced by a simple conductive layer cooperating directly with film 16, or another conductive structure closely associated with film 16, to produce the transverse field. Assuming an N-type semi-conductor film with a carrier density $n_o$ and a negative potential V produced at the surface of the semi-conductor by strip 20, a depletion layer (absence of electrons) will be produced within film 16. The potential V is measured with respect to the interior of film 16 below the depletion layer. The thickness *d* of that depletion layer will be:

$$d=(2\epsilon V/n_o e)^{1/2},$$

where $\epsilon$ is the permittivity of the semi-conductor and *e* is the electronic charge. With the semi-conductive film having a thickness greater than *d*, the film resistance thus can be varied from its equilibrium value at ambient temperature to a much higher value through adjustment of potential V. However, there is a limit to this technique. Inside film 16, the valence and conduction bands are bent by the transverse field, the valance band being brought closer to the Fermi level. When the spacing between the Fermi level and the valence band reaches a value approximately equal to the Fermi potential in the interior of the film, inversion takes place and holes are generated at the surface to form a P-type conducting channel that destroys the amplification process.

It is to avoid the possibility of inversion occurring along the length of film 16 that resistive strip 20 is utilized. Source 23 preferably is adjusted so that the potential gradient along strip 20 is identical to that along the adjacent portion of film 16. Additional source 24 then creates a constant potential difference between any point in film 16 and the adjacent point in strip 20 to produce the desired degree of charge-carrier depletion.

In order for resistive strip 20 to have minimal effect on the gain mechanism, it preferably is spaced at least a half wavelength from the interface between film 16 and substrate 12. Otherwise, strip 20 should have a carrier mobility much less than that of film 16 so as not to couple appreciably to the charge bunches in film 16. Subject to these qualifications, strip 20 may be placed wherever convenient in given assembly. Its illustrated location, on the back side of substrate 12, is advantageous when using a ceramic-type piezoelectric material in that the typically high permittivity of the latter permits a reduction in the bias voltage level required.

The described surface wave filter or delay line includes an amplifying mechanism improved in a manner that permits the attainment of significant gain of signals being transmitted. Moreover, the construction is such that all components may be formed by utilizing fabrication techniques now more or less conventional in the integrated circuit art.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A signal amplifier comprising:
   - a piezoelectric substrate propagative of acoustic surface waves;
   - an input transducer on said substrate responsive to an input signal for launching acoustic surface waves along a predetermined path at a given velocity;
   - an output transducer on said substrate responsive to said acoustic surface waves for developing an output signal;
   - a film of semi-conductive material on said substrate between said input and output transducers responsive to an applied unidirectional potential for conducting charge carriers alongside said path;
   - means for applying a unidirectional potential to said film with a magnitude adjusted to effect movement of said charge carriers at a velocity slightly greater than said given velocity to achieve amplification of said acoustic surface waves;
   - and control means for applying a unidirectional field transversely through said film and said substrate for controlling the density of said charge carriers in said semi-conductive material and the amplification of said acoustic surface waves.

2. An amplifier as defined in claim 1 in which said control means includes field producing elements disposed respectively on opposite sides of said substrate.

3. An amplifier as defined in claim 1 in which said control means includes a strip of resistive material disposed on said substrate in a location spaced from said film to develop said field.

4. An amplifier as defined in claim 3 in which the charge-carrier mobility in said strip is substantially less than that in said film.

5. An amplifier as defined in claim 3 in which said strip is spaced from said film a distance at least one-half the wavelength of said acoustic surface waves.

6 An amplifier as defined in claim 3 in which said strip exhibits a potential gradient along its length substantially identical to that along said film.

7. In a signal transmission device in which acoustic surface waves propagate along a piezoelectric substrate and co-act with charge carriers traveling in a semi-conducting medium for the amplification of signal energy, the improvement comprising:
   - a unidirectional potential coupled transversely of said medium for establishing a unidirectional electric field extending through said medium in a direction transverse to the direction of travel of said charge carriers to decrease the density of said charge carriers.

* * * * *